Dec. 3, 1940.  S. H. CALDWELL ET AL  2,223,814
TUBE CONSTRUCTION
Filed May 12, 1938
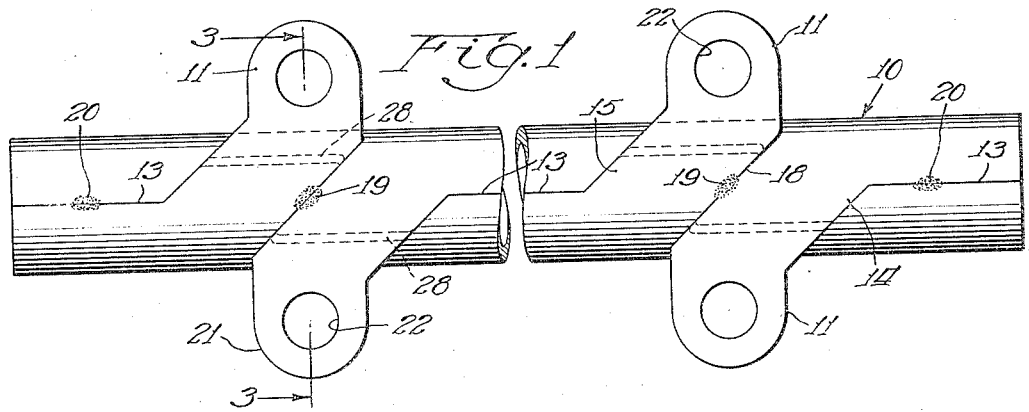
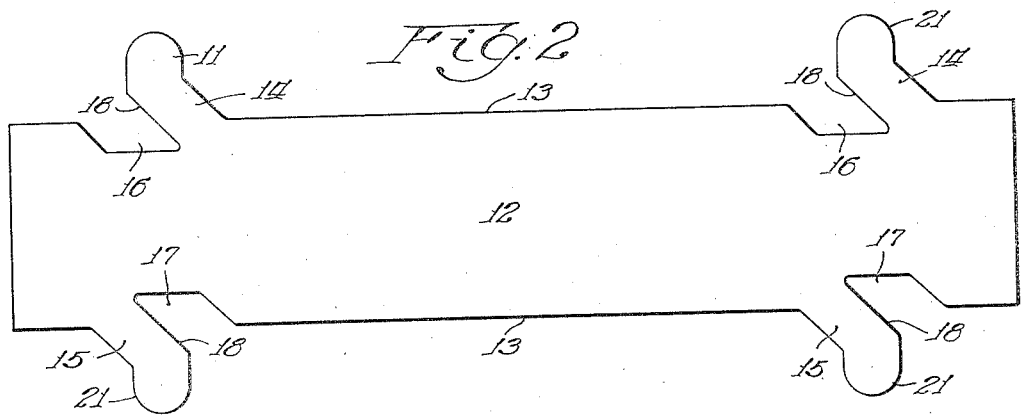
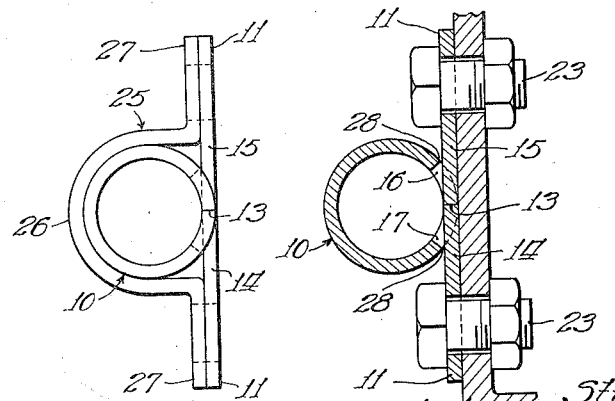 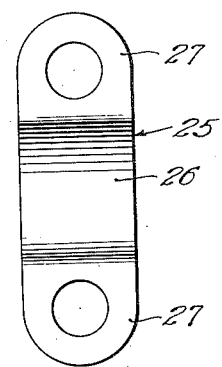
Inventors:
Stuart H. Caldwell and
John J. Linton,
By: Edward P. Fritzbaugh
Atty.

Patented Dec. 3, 1940

2,223,814

UNITED STATES PATENT OFFICE 2,223,814

TUBE CONSTRUCTION

Stuart H. Caldwell, Detroit, Mich., and John J. Linton, Chicago, Ill., assignors to Borg-Warner Corporation, Chicago, Ill., a corporation of Illinois Application May 12, 1938, Serial No. 207,460

4 Claims. (Cl. 138—47)

Our invention relates to tubes or conduits adapted to be mounted on a support, and has as its object to provide a tubular construction particularly adapted for heavy duty service as a bearing bracket useable, for example, in connection with a vehicle front wheel suspension of the type popularly known as "knee-action," wherein the tubular part has mounting ears formed integrally therewith.

Another object of the invention is to provide such a tubular construction which is relatively simple and inexpensive, and yet very strong and durable. More specifically, the invention aims to provide a tubular construction in which abutting side regions are joined or lapped together by integral tongues extending in opposite directions across the seam where the edges of said side regions abut each other, the tongues being offset axially into abutting and interlocking engagement with each other.

Another object of the invention is to provide a tubular construction in which the mounting ears are formed as continuations of such interlocking tongues.

The invention further contemplates the provision of a tubular construction including mounting means for attachment to a supporting member, wherein the attachment to the supporting member serves to securely hold the tubular portion of the member against opening at the seam.

Other objects, the advantages and uses of the invention will become apparent after reading the following specification and claims, and after consideration of the drawing forming a part of the specification, wherein:

Fig. 1 is a plan view of a tubular construction embodying the invention;

Fig. 2 is a plan view of the blank used in forming the same;

Fig. 3 is a transverse sectional view taken on the line 3—3 of Fig. 1;

Fig. 4 is a similar view of a somewhat modified form of the invention, embodying an auxiliary reenforcing strap; and Fig. 5 is a plan view of such strap.

As an example of one form of the device in which the invention may be embodied, we have selected for illustration herein a bearing bracket adapted for use in connection with well-known "knee-action" vehicle wheel suspensions. Such a bracket must be exceedingly strong and able to withstand the most rigorous abuse under service conditions. Being fairly long, a bracket of this type adapts itself well to the construction contemplated by the present invention.

In Fig. 1, we have shown such a bracket, the bearing portion of which is indicated generally at 10. The mounting ears 11 are adapted to be attached to a suitable portion of the frame of an automotive vehicle, as for example, the underside of a chassis cross member.

The bearing tube 10 and the ears 11 are formed from a single blank of material shown in Fig. 2, such blank being designated generally at 12 and having side regions terminating in side edges 13. In the finished tube, the edges 13 are brought into abutting relationship to form a seam extending longitudinally of the tube as shown in Fig. 1.

The sheet of material 12 may be of very heavy gauge cold rolled sheet steel stock.

Integral tongues 14 and 15 respectively, are formed on the opposite sides of the blank, and extend diagonally in opposite directions, parallel to each other, as shown. Adjacent to the tongues 14 and 15 are notches 16 and 17, respectively, extending inwardly from the edges 13 of the sheet 12.

The notch 16 is transversely opposed to the tongue 15 and of substantially the same width as the tongue 15 so as to snugly receive the same when the blank is rolled into tubular form. Likewise, the notch 17 is transversely opposed to the tongue 14 and adapted to receive the same snugly.

Axially, the tongues 14 and 15 extend toward each other. The inner diagonal edge 18 of each tongue forms a continuation of one of the edges of the companion notch. When the blank has been rolled into tubular form, the edges 18 will abut each other, as shown in Fig. 1. Since the tongues 14 and 15 extend toward each other axially, this abutting engagement between the edges 18 will constitute an interlocking engagement such as to prevent the abutting side regions of the tube from spreading at the seam defined by the edges 13.

The edges 18 may be welded together, as indicated at 19 in Fig. 1, and the edges 13 may be welded as indicated at 20 in Fig. 1. Such welding, however, it will be understood, is optional and may be dispensed with if desired. It does to some extent increase the rigidity of the entire bearing assembly, although it will be understood that rigidity is largely derived from the interlocking relationship of the tongues 14 and 15 in the grooves 17 and 16, respectively.

Formed on the ends of the tongues 14 and 15 are ears 21 which are apertured at 22 to receive bolts 23 for securing them to a support such as the side wall of a chassis rail 24 of an automotive vehicle. When thus secured to a support, the ears 11 are securely held against movement toward each other, thereby securing the tongues 14, 15 against pulling apart, and securing the abutting side regions of the bushing 10 against spreading. The supporting wall 24 constitutes a tie member for this purpose.

Where the device is to be attached to points of support that are not rigidly connected together, or where the load on the bearing is too great for the section modulus of the two tongues, a tie strap 25 may be employed, such strap including a yoke portion 26 extending around the bushing 10 and ears 27 registering with the ears 11 of the bushing.

The tongues 14, 15 and ears 11 are preferably arranged in a common plane, as shown in Figs. 3 and 4, tangent to the bearing 10. The side edges of the tongues 14 and 15 will thus be straight, while the corresponding edges of the notches 16 and 17 will be curved, as indicated in Fig. 3. This makes it possible for the tongues to extend into the notches and thence out of them and beyond, clearing the corners 28 of the notches, as shown in Fig. 3. Thus the abutting edges of the tongues and notches do not abut each other full width for their entire length, and the term "abutting" as herein used in connection with the tongues, will be understood as not being restricted to complete full width abutment.

The tongues 14 and 15 may, if desired, be arranged at right angles to the edges 13, and the connection to the supporting wall 24 relied upon completely for tying the abutting edges of the bearing together against spreading at the seam. The diagonal relationship shown is preferred, for the reason that it makes it possible to arrange the ears 11 transversely opposite to each other on a common axis at right angles to the seam 13.

A bearing bracket constructed in accordance with the present invention is considerably stronger than a corresponding bracket of cast iron, and yet is less expensive to construct. Cast iron is relatively brittle in comparison to cold rolled sheet steel of the same thickness, and is much more apt to break or crack under the conditions met with in service. It requires machining of the bearing surface in the bore of the bearing, whereas a bearing constructed in accordance with the present invention may be rolled with such accuracy that machining is unnecessary.

We claim:

1. An article of manufacture comprising a tube having side regions abutting each other along a line extending lengthwise of the tube, said side regions having integral tongues extended across said line in opposite directions in abutting relationship and terminating in ears projecting laterally from the tube and adapted for mounting said tube on a support.

2. An article of manufacture comprising a tube including side regions having edges abutting each other along a line extending lengthwise of the tube, said side regions having integral tongues extended across said line in opposite directions in abutting relationship and terminating in ears projecting laterally from the tube and aligned with each other on an axis at right angles to said line, the abutting edges of said tongues crossing said axis, whereby said tongues are interlocked so as to secure said side regions against spreading at said line.

3. An article of manufacture comprising a tube including side regions having edges abutting each other along a line extending lengthwise of the tube, said side regions each having a helical notch opening into its side edge and an integral tongue, one side of which forms a continuation of one side of its respective notch, the tongue of each side member being received in the notch of the opposing side member whereby to lock said side members together, at least one of said tongues terminating in an integral ear adapted for mounting said tube on a support.

4. In combination with a support, a tube including side regions having edges abutting each other along a line extending lengthwise of the tube, said side regions having integral tongues extended across said line in opposite directions and terminating in ears, and means securing said ears to said support, the latter serving as a tie member to prevent spreading of said tube at the seam.

STUART H. CALDWELL.
JOHN J. LINTON.